US011580583B2

(12) United States Patent
Yabushita et al.

(10) Patent No.: US 11,580,583 B2
(45) Date of Patent: Feb. 14, 2023

(54) INFORMATION PROCESSING APPARATUS, INFORMATION PROCESSING SYSTEM AND INFORMATION PROCESSING METHOD

(71) Applicant: TOYOTA JIDOSHA KABUSHIKI KAISHA, Toyota (JP)

(72) Inventors: Hiroki Yabushita, Toyota (JP); Keiichi Kondo, Chiryu (JP); Kaori Takahashi, Nagoya (JP); Jin Xin, Nagoya (JP); Daisuke Mizushima, Toyota (JP); Satoru Ando, Nagoya (JP); Takeshi Murakami, Okazaki (JP); Yuchi Yamanouchi, Toyota (JP); Kenta Miyahara, Toyota (JP); Katsuhisa Yoshikawa, Toyota (JP); Yuji Suzuki, Kariya (JP); Keita Yamazaki, Nissin (JP); Kei Matsumoto, Toyota (JP); Hiroyuki Ito, Nagoya (JP); Takashi Ogawa, Toyota (JP); Yukiya Sugiyama, Toyota (JP); Masaru Ando, Seto (JP); So Sawahira, Toyota (JP); Rina Mukai, Toyota (JP); Azusa Nakagame, Kariya (JP); Erina Toyama, Toyota (JP); Yasushi Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 17/117,850

(22) Filed: Dec. 10, 2020

(65) Prior Publication Data
US 2021/0201376 A1 Jul. 1, 2021

(30) Foreign Application Priority Data
Dec. 25, 2019 (JP) .............................. JP2019-234936

(51) Int. Cl.
*G06Q 30/00* (2012.01)
*G06Q 30/0601* (2023.01)

(52) U.S. Cl.
CPC ..... *G06Q 30/0621* (2013.01); *G06Q 30/0603* (2013.01); *G06Q 30/0611* (2013.01); *G06Q 30/0631* (2013.01); *G06Q 30/0639* (2013.01)

(58) Field of Classification Search
CPC .... G06Q 30/0601–0645; B62D 63/025; B62D 21/09; B62D 21/12; B62D 27/06; B60K 1/02; B60K 1/04
(Continued)

(56) References Cited

U.S. PATENT DOCUMENTS 10,545,509 B1 * 1/2020 Jessen .................. B62D 63/025
2003/0038442 A1 2/2003 Chernoff et al.
(Continued)

FOREIGN PATENT DOCUMENTS

EP 3667583 A1 * 6/2020
JP 2003-022316 A 1/2003
(Continued)

OTHER PUBLICATIONS

Griffith, C. (Jan. 7, 2019). Aussie company to roll out electric cars. The Australian Retrieved from https://dialog.proquest.com/professional/docview/2163758418?accountid=131444 (Year: 2019).*
(Continued)

*Primary Examiner* — Michael Misiaszek
*Assistant Examiner* — Kennedy Gibson-Wynn
(74) *Attorney, Agent, or Firm* — Sughrue Mion, PLLC

(57) ABSTRACT

The present disclosure provides a technique that enables customization of a vehicle. In an information processing apparatus, a controller presents vehicle units extracted from among a plurality of types of under units each of which is provided with a driving mechanism configured to cause
(Continued)

wheels to rotate and a plurality of types of upper units to be loaded on any of the under units to a user, the vehicle units being combinable as a vehicle. Furthermore, the controller executes: accepting selection by a user from among the presented vehicle units; and calculating a fee in the case of providing the selected vehicle units.

17 Claims, 8 Drawing Sheets

(58) Field of Classification Search
USPC .............................................. 705/26.1–27.2
See application file for complete search history.

(56) References Cited

U.S. PATENT DOCUMENTS

| | | | | |
|---|---|---|---|---|
| 2015/0083509 | A1* | 3/2015 | Borroni-Bird | B60W 10/08 |
| | | | | 180/204 |
| 2017/0197679 | A1* | 7/2017 | Scaringe | B60K 1/02 |
| 2020/0139802 | A1 | 5/2020 | Nagasaka | |
| 2020/0151625 | A1* | 5/2020 | Wunsche, III | G06Q 50/30 |
| 2020/0219179 | A1* | 7/2020 | Matsumoto | G06Q 30/0283 |
| 2021/0061157 | A1* | 3/2021 | Castillo | B62D 24/00 |
| 2021/0093972 | A1* | 4/2021 | Silverglate | A63H 17/00 |

FOREIGN PATENT DOCUMENTS

| | | | |
|---|---|---|---|
| JP | 2004-252858 A | 9/2004 | |
| JP | 2018-176798 A | 11/2018 | |
| WO | WO-2018006916 A1 * | 1/2018 | ........... B60K 17/356 |

OTHER PUBLICATIONS

"Don't Break Up with Your Car, Upgrade it." Targeted News Service, Jan. 8, 2019, p. n/a. ProQuest. Web. Nov. 1, 2022 . (Year: 2019).*

* cited by examiner

Fig. 4

| IDENTIFICATION INFORMATION | CLASSIFICATION | USE PURPOSE | NUMBER OF PASSENGER | SIZE | WEIGHT | UPPER SPEED LIMIT | USE DATE AND TIME |
|---|---|---|---|---|---|---|---|
| N101102 | UPPER UNIT | CAMPING | 2 | L=4900 W=1850 H=1900 | 150 | 100 | 12/10 9:00~ 12/10 18:00 |
| N103851 | UPPER UNIT | HOUSE-MOVING TRANSPORTATION OF HEAVY THING | 2 | L=4900 W=1850 H=1600 | 250 | 80 | |
| N101199 | UNDER UNIT | SKIING SNOWBOARDING TRAVEL ON FROZEN ROAD | 7 | L=4900 W=1850 | 300 | 80 IN THE CASE OF H=1800 OR MORE | |
| N301262 | SEAT | | 1 | 50×40 | 10 | | 12/10 9:00~ 12/24 20:00 |
| N405742 | CHILD SEAT | TAKING CHILDREN | 1 | 60×40 | 5 | | |
| N521129 | TIRE | SKIING SNOWBOARDING TRAVEL ON FROZEN ROAD | | 175/55R15 | | | 12/10 9:00~ 12/10 18:00 |
| ... | ... | ... | ... | ... | ... | ... | ... |

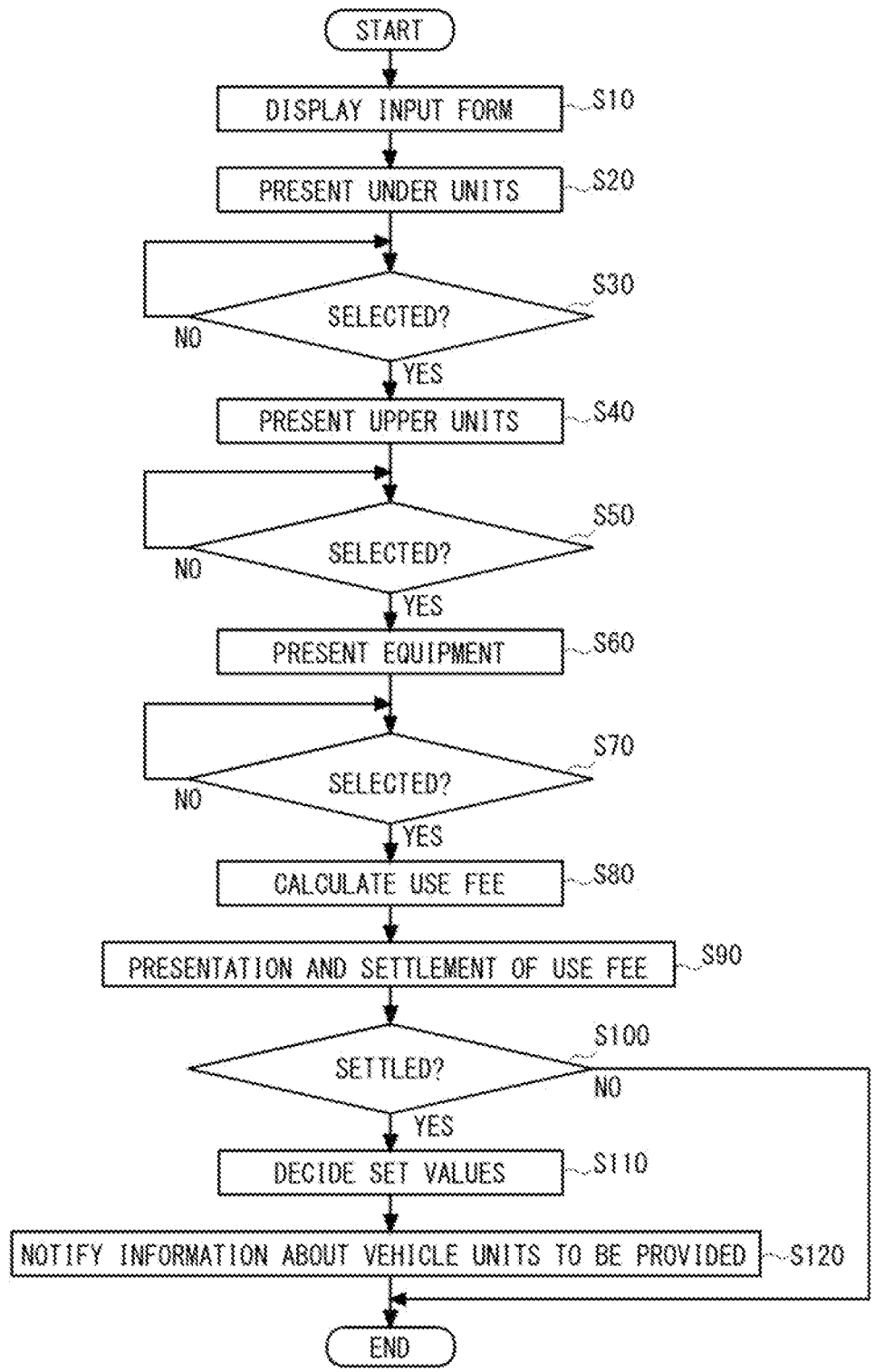

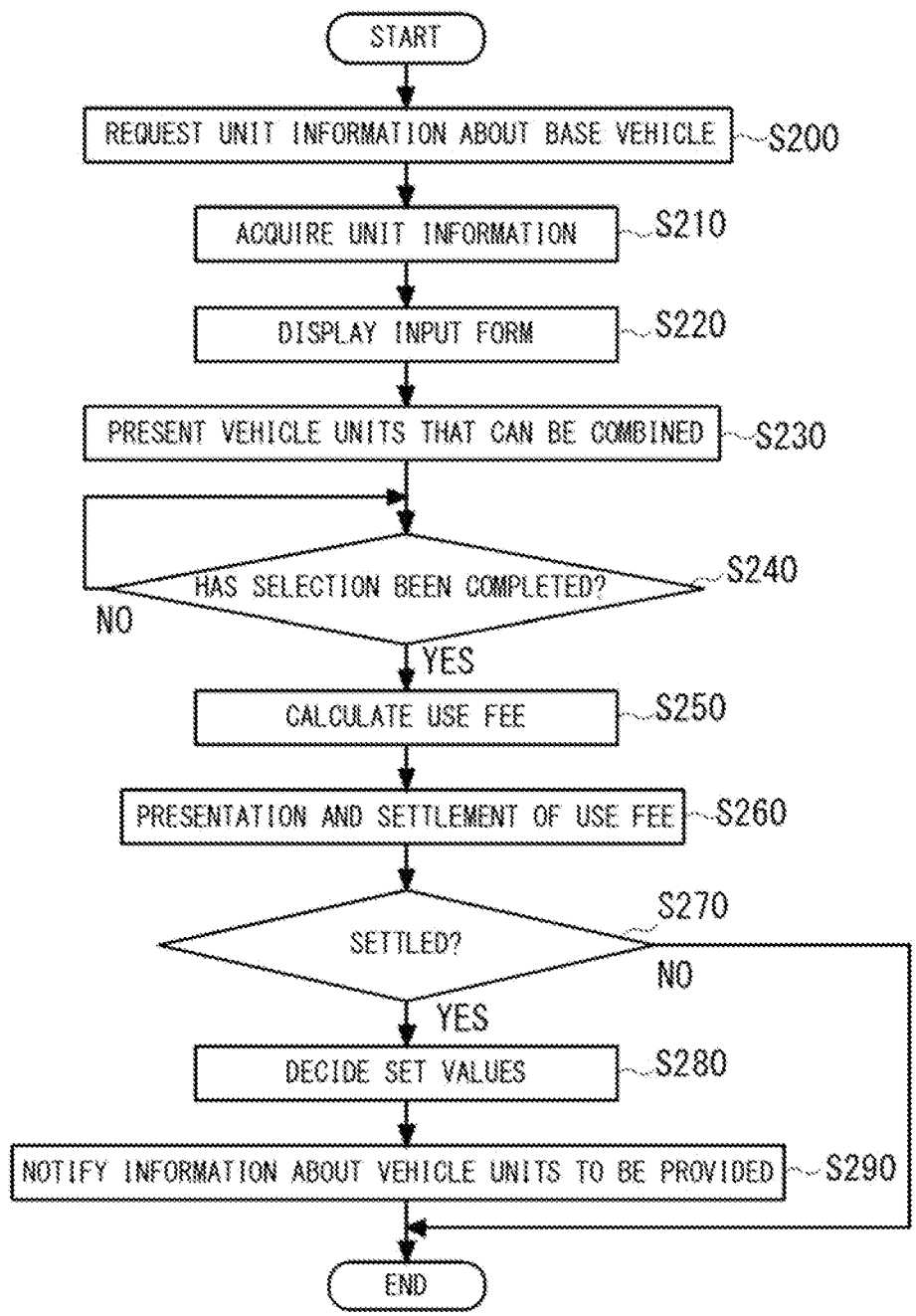

INFORMATION PROCESSING APPARATUS, INFORMATION PROCESSING SYSTEM AND INFORMATION PROCESSING METHOD

CROSS REFERENCE TO THE RELATED APPLICATION

This application claims the benefit of Japanese Patent Application No. 2019-234936, filed on Dec. 25, 2019, which is hereby incorporated by reference herein in its entirety.

BACKGROUND

Technical Field

The present disclosure relates to an information processing apparatus, an information processing system and an information processing method.

Description of the Related Art

In Patent document 1, a multi-purpose platform, that supports various types of working units by the whole top surface of a car body frame being exposed to the outside.

CITATION LIST

Patent Document

Patent document 1: Japanese Patent Laid-Open No. 2018-176798

SUMMARY

An object of the present disclosure is to provide a technique that makes it possible to provide a vehicle customized according to a user's request.

An information processing apparatus according to one aspect of the present disclosure may be provided with a controller configured to execute:

presenting a plurality of vehicle units extracted from among a plurality of types of under units each of which is provided with a driving mechanism configured to cause wheels to rotate and a plurality of types of upper units to be loaded on any of the under units to a user, the plurality of vehicle units being combinable as a vehicle;

accepting selection by the user from among the plurality of vehicle units; and calculating a fee in the case of providing the selected vehicle units.

An information processing system according to one aspect of the present disclosure may be provided with:

a vehicle control apparatus mounted on an under unit or an upper unit of a vehicle configured by combining the under unit and the upper unit, the under unit comprising a driving mechanism configured to cause wheels to rotate, and the upper unit to be loaded on the under unit; and an information processing apparatus configured to perform a process for providing a vehicle unit that is the under unit or the upper unit, and the information processing apparatus comprises a controller configured to execute:

presenting a plurality of vehicle units that is combinable as the vehicle, among a plurality of types of the vehicle units, to a user, each of the plurality of types of the vehicle units being the above vehicle unit;

accepting selection by the user from among the plurality of vehicle units; and calculating a fee in the case of providing the selected vehicle units.

In an information processing method according to one aspect of the present disclosure, a computer may execute:

presenting a plurality of vehicle units extracted from among a plurality of types of under units each of which is provided with a driving mechanism configured to cause wheels to rotate and a plurality of types of upper units to be loaded on any of the under units to a user, the plurality of vehicle units being combinable as a vehicle;

accepting selection by/the user from among the plurality of vehicle units; and calculating a fee in the case of providing the selected vehicle units.

According to the present disclosure, it is possible to provide a technique that makes it possible to provide a vehicle customized according to a user's request.

BRIEF DESCRIPTION OF THE DRAWINGS

FIG. 4 is a diagram illustrating an example of information indicating vehicle units;

FIG. 5 is a diagram illustrating a process about presentation of the vehicle units and calculation of a fee that is executed by the information processing apparatus according to the first embodiment;

FIG. 8 is a diagram illustrating a process about presentation of vehicle units and calculation of a fee that is executed by the information processing apparatus according to the second embodiment.

DESCRIPTION OF THE EMBODIMENTS

Figure 1:
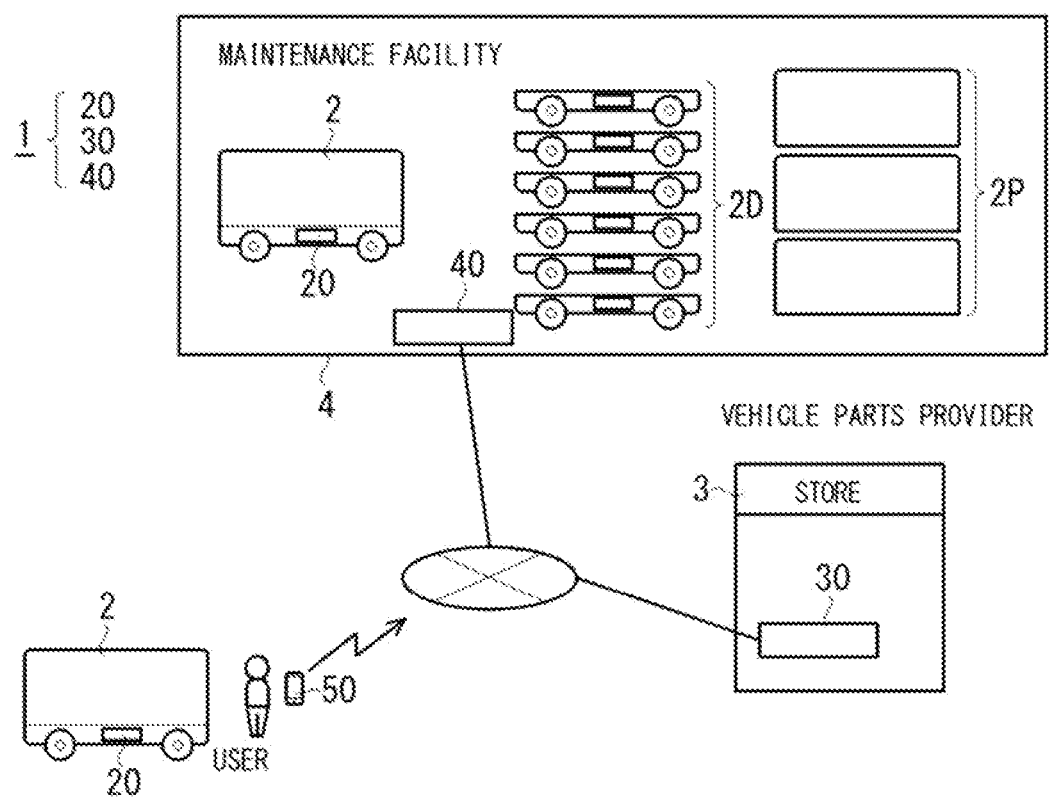
FIG. 1 is a block diagram illustrating a schematic configuration of an information processing system according to a first embodiment.

An information processing apparatus of the present disclosure may be provided with a controller configured to execute:

presenting a plurality of vehicle units extracted from among a plurality of types of under units each of which is provided with a driving mechanism configured to cause wheels to rotate and a plurality of types of upper units to be loaded on any of the under units to a user, the plurality of vehicle units being combinable as a vehicle;

accepting selection by the user from among the plurality of vehicle units; and calculating a fee in the case of providing the selected vehicle units.

Thus, since this information processing apparatus may present a plurality of combinable vehicle units to a user, and may calculate a fee for vehicle units selected by the user, it is possible to provide the vehicle unit in exchange for the fee, and it is possible to realize a business of performing sales and rental of vehicle units. Thereby, the user can accept provision of each vehicle unit in exchange for a fee and can easily customize a vehicle.

Further, an information processing system, of the present disclosure may be provided with:

a vehicle control apparatus mounted on an under unit or an upper unit of a vehicle configured by combining the under unit and the upper unit, the under unit comprising a driving mechanism configured to cause wheels to rotate, and the upper unit to be loaded on the under unit; and an information processing apparatus configured to perform a process for providing a vehicle unit that is the under unit or the upper unit, and the information processing apparatus comprises a controller configured to execute:

presenting a plurality of vehicle units that is combinable as the vehicle, among a plurality of types of the vehicle units, to a user, each of the plurality of types of the vehicle units being the above vehicle unit;

accepting selection by the user from among the plurality of vehicle units; and calculating a fee in the case of providing the selected vehicle units.

Thus, this information processing system can realize a business of performing sales and rental of vehicle units, by presenting a plurality of vehicle units that are combinable to a user and calculating and presenting a fee for vehicle units selected by the user. Further, the user can select a vehicle unit and customize a vehicle he uses at will.

The controller may present the plurality of vehicle units that is combinable as the vehicle, based on at least one of a destination location, the number of passengers and a load weight input by the user. Thereby, the information processing apparatus can present appropriate vehicle units corresponding to an upper speed limit, the number of passengers and a load weight of a vehicle and cause convenience of the user to be improved.

The vehicle may be provided with one of the vehicle units, that is either one of the under units or one of the upper units, beforehand, and the controller may present the plurality of vehicle units that are combinable with the vehicle, based on unit information indicating the vehicle unit that the vehicle is provided with beforehand. Thereby, the controller can present vehicle units that are combinable with a vehicle unit that a base vehicle, for example, a vehicle that the user owns is already provided with, to the user.

The controller may present the vehicle units based on a use purpose of the vehicle specified by the user. For example, if the use purpose is "camping", upper units provided with beds and cooking equipment are presented. If the use purpose is "house-moving", upper units provided with a cargo bed like a truck are presented. Thereby, it is possible to present vehicle units according to use purposes, and it is possible to facilitate selection by the user.

The controller may output setting information for setting a travel condition to the vehicle based on combination of the vehicle units selected by the user. Thereby, it is possible to cause a travel condition to be set for the vehicle according to combination of the vehicle units.

The travel condition may be at least one of an upper speed limit, a setting for suspensions, a jerk at the time of starting and a jerk at the time of stopping. Thereby, for example, in the case of fitting an upper unit for camping or an upper unit for a truck to the vehicle, an upper speed limit for the vehicle is set low. Further, attenuation force of the suspensions may be set according to travel routes. For example, when it is scheduled to travel on a mountain path, attenuation force at the time of rolling is increased.

When the vehicle units are rented, the controller may calculate the fee based on a period of use from start to end of rental of the vehicle units. Thereby, for example, a use fee according to a rental time (a period of use) can be set, and it is possible to realize a business of renting vehicle units.

In an information processing method of the present disclosure, a computer may execute:

presenting a plurality of vehicle units extracted from among a plurality of types of under units each of which is provided with a driving mechanism configured to cause wheels to rotate and a plurality of types of upper units to be loaded on any of the under units to a user, the plurality of vehicle units being combinable as a vehicle;

accepting selection by the user from among the plurality of vehicle units; and calculating a fee in the case of providing the selected vehicle units.

Thus, in the information processing method of the present disclosure, a plurality of vehicle units combinable with a vehicle specified by the user may be presented to the user, and a fee for vehicle units selected by the user may be calculated. Thereby, the information processing method of the present disclosure makes it possible to provide the vehicle unit in exchange for the fee, and it is possible to realize a business of performing sales and rental of vehicle units. Further, the user can select a vehicle unit and customize a vehicle he uses at will.

First Embodiment

An information processing system provided with an information processing apparatus according to the present embodiment will be described below using drawings. FIG. 1 is a block diagram illustrating a schematic configuration of an information processing system (a vehicle unit providing system). An information processing system. 1 has onboard device 20 provided in each vehicle 2, an information processing apparatus 30 provided in a store of an agent that provides vehicle units, and a terminal 40 provided in a maintenance facility 4. Note that, though a configuration is made in which the information processing system 1 does not include each user terminal 50 in the present embodiment, a configuration is also possible in which the information processing system 1 includes each user terminal 50.

A user operates an input device of the user terminal 50 or the information processing apparatus 30 to input information for extracting a vehicle or vehicle units, such as a purpose, a use starting point, a destination point, a use ending point, a use date and time, the number of passengers and an amount of luggage (a volume or a load weight) to the information processing apparatus 30. In response to the input, the information processing apparatus 30 extracts and presents vehicle units to be combined as a vehicle from a database as described later. When the user selects vehicle units from among the presented vehicle units, the information processing apparatus 30 calculates a fee for the selected vehicle units and presents the fee to the user. The user confirms the presented fee, and performs fee settlement processing and contract processing for using the vehicle units. When the contract processing is completed, the information processing apparatus 30 transmits order information to the maintenance facility 4 to request assembly of the selected vehicle units to cause the vehicle units to be assembled. When the vehicle is capable of autonomous driving, the information processing apparatus 30 inputs route information including the use starting point (a departure location), the destination point, the use ending point and the like to the vehicle 2 and causes the vehicle to move to the use starting point such as the user's home by the use starting time. When the vehicle 2 arrives at the use ending point, and the use is completed, the vehicle 2 returns to a predetermined place such as the maintenance facility.

Figure 2:
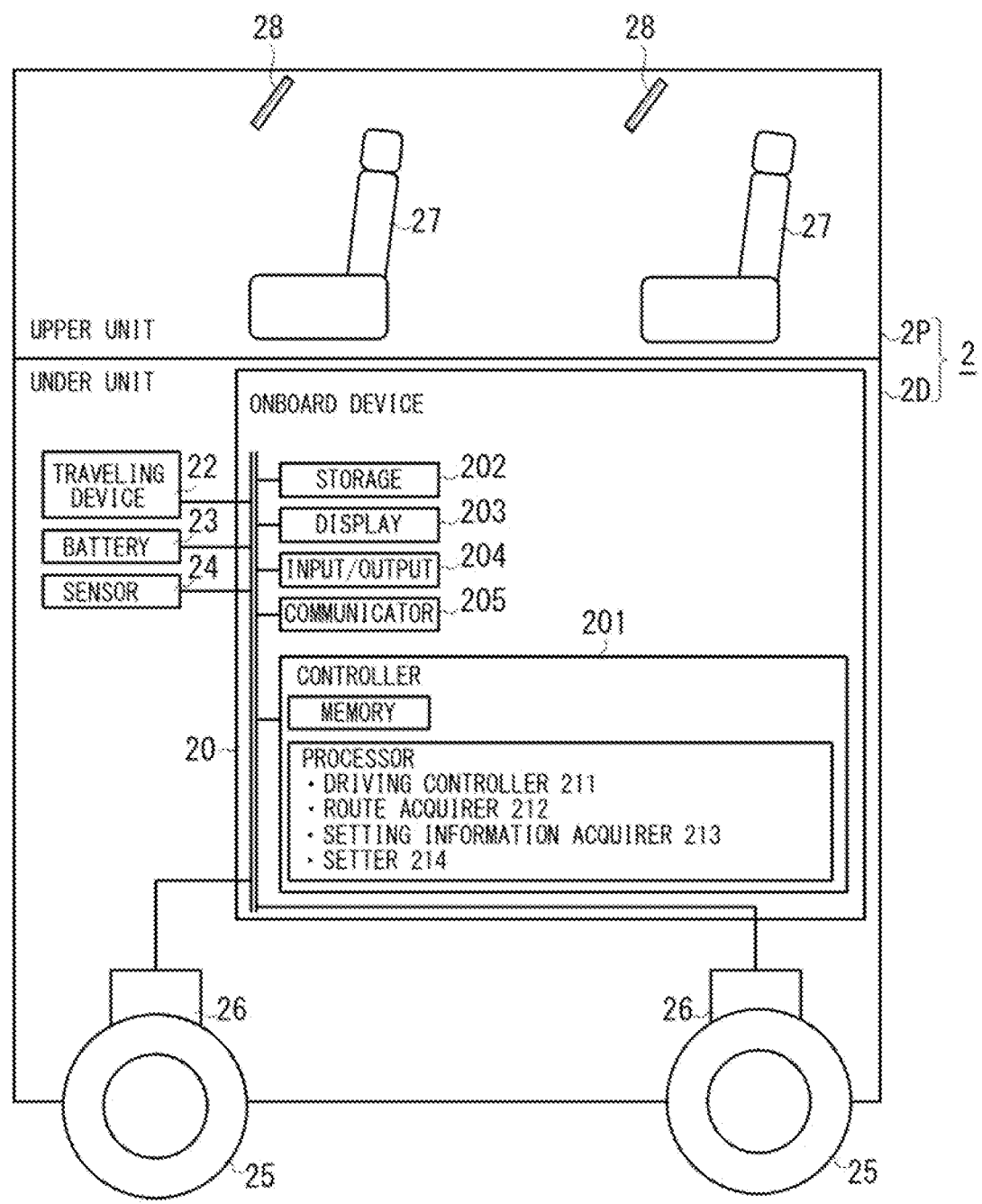
FIG. 2 is a block diagram illustrating a schematic configuration of a vehicle.

FIG. 2 is a block diagram illustrating a schematic configuration of the vehicle 2. As illustrated in FIG. 2, the vehicle 2 is provided with an under unit 2D and an upper unit 2P. The under unit 2D is provided with equipment such as an onboard device 20, a traveling device 22, a battery 23, a sensor 24, tires (wheels) 25 and suspensions 26. The upper unit 2P is provided with equipment such as seats 27 for users to sit on and a display device 28.

The traveling device 22 is a mechanism that causes the vehicle 2 to travel and has a power source such as an internal combustion engine or a motor, a generator, a transmission mechanism, a braking mechanism, a steering mechanism, and the like.

As the transmission mechanism, a transmission is given which transmits driving force generated by the power source to wheels, changing the torque, rotation rate and rotation direction of the driving force, to drive the wheels. Note that a configuration is also possible in which the wheels are directly driven by the power source without using the transmission mechanism, like a wheel-in motor.

The battery 23 supplies power to each portion of the vehicle 2 such as the onboard device 20, the traveling device 22 and the sensor 24. As the battery 23, various types of batteries can be adopted, such as a battery that stores power generated by the generator of the traveling device 22, a battery that stores power when being connected with an external commercial power supply, or a fuel cell that generates power using fuel such as hydrogen.

The sensor 24 includes a vehicle speed sensor, an acceleration sensor, a direction sensor, a rainfall sensor, a temperature sensor, an obstacle sensor, a position sensor and the like and detects at least one of states of the vehicle of the sensor 24 and surrounding states. The obstacle sensor may be a camera, a radar, a LiDAR (Laser Imaging Detection and Ranging) or the like. The position sensor is a sensor that detects a current position of the vehicle of the sensor 24. The position sensor may be, for example, a positioning device in a satellite positioning system such as a GPS receiver.

The onboard device 20 controls each portion of the vehicle 2, such as the traveling device 22. For example, the onboard device 20 causes the vehicle 2 to autonomously travel according to a travel route set by the user. In other words, the vehicle 2 is an autonomous car that travels by control by the onboard device 20. Note that the vehicle 2 is not limited to an autonomous car but may be a vehicle that a driver manually drives based on a travel route and stop positions presented by the onboard device 20.

The onboard device 20 is a computer mounted on the vehicle 2 and is provided with a controller 201, a storage 202, a display 203, an input/output 204 and a communicator 205.

The controller 201 controls an operation of the whole onboard device 20 to realize various kinds of functions that the onboard device 20 has. The controller 201 is provided, for example, with a processor and memories. The processor comprehensively controls the operation of the onboard device 20. The processor is also referred to as a CPU or an MPU. The memories are, for example, a ROM and a RAM. The RCM is a storage medium that stores various kinds of programs or data. The RAM is a storage medium that temporarily stores various kinds of programs or data. The FLAM may be accessible directly from the processor and function as a main memory.

The storage 202 is a storage device such as an HDD or an SSD. The storage 202 functions as an external storage device of the controller 201. The storage 202 stores map information, route information, setting information by an administrator and the like. The display 203 is means that displays information and is, for example, a liquid crystal display device, an organic EL display device or the like. The display 203 may be a display device provided in a vehicle to perform display for passengers in the vehicle or may be an external display device provided outside the vehicle to perform display for people outside the vehicle.

The input/output 204 is means that performs input/output of information to/from the controller 201, for example, means that performs acceptance of an operation from the user and output of information to the user, and is, for example, buttons, a keyboard, a touch panel, a display, a speaker or the like. The communicator 205 is a communication interface for performing communication with an external apparatus via a communication line. The communicator 205 may be provided with a plurality of communication interfaces such as an interface that directly communicates with other vehicles, in addition to the interface that performs communication via a communication network. As the interface that directly communicates with other vehicles, a communication interface that performs communication using Bluetooth (registered trademark), ZigBee (registered trademark) or the WiFi (registered trademark) ad-hoc mode is given. Further, the communicator 205 may be a communication interface that performs communication using commercial radio (simple radio).

In the controller 201, the processor executes a program stored in the ROM, the storage 202 or the like with the RAM as a work area. By executing the program, the controller 201 functions as functional units such as a driving controller 211, a route acquirer 212, a setting information acquirer 213 and a setter 214. The controller 201 may realize functions of the plurality of functional units by a plurality of processors or a plurality of cores included in a single processor, respectively. Further, in the controller 201, a single processor may realize the functions of the plurality of functional units by a technique such as a multi-task or multi-thread technique.

The driving controller 211 processes information acquired via the sensor 24 or the input/output 204 and executes control to cause the vehicle 2 to autonomously travel according to route information. For example, if acquiring route information indicating a departure location, a destination location, an arrival location and the like by an input operation by the user or an input from another apparatus, the driving controller 211 causes the vehicle 2 to travel from the departure location to the arrival point (the destination location) according to a travel route indicated by the route information. In other words, the driving controller 211 controls the steering mechanism to change a lane to travel on and autonomously executes control of starting or stopping according to traffic signals, adjusting a travel speed according to a speed limit and speeds of surrounding vehicles, avoiding an obstacle, and the like. The route information may include a plurality of travel routes such as an outbound route from a departure location such as the user's home to a first destination location and an inbound route to a destination location such as the home, with the first destination location as a departure location.

The route acquirer 212 acquires the route information indicating a travel route of the vehicle 2. For example, the route acquirer 212 communicates with the information processing apparatus 30 via a communication line to receive the route information. Further, the route acquirer 212 may receive input of the route information by an operation on the input by the user.

The setting information acquirer 213 communicates with the information processing apparatus 30 via the communication line to receive setting information from the information processing apparatus 30. The setter 214 causes a set value of each of portion of the vehicle 2, such as an accelerator, a brake, suspensions, an air conditioner and the like to be stored into the storage 202 based on the setting information acquired by the setting information acquirer 213. Thereby, the setter 214 make settings so that the driving controller 211 reads out the set value from the storage 202 and performs control according to the set value. For example, the setter 214 sets a jerk at the time of the vehicle 2 starting. In this case, a degree of accelerator opening to be increased per predetermined unit time is stored into the storage 202. Thereby, an amount of change in acceleration at the time of starting is set, for example, so that, the vehicle 2 slowly accelerates at the time of starting, or the vehicle 2 quickly accelerates at the time of starting. Further, the setter 214 sets a jerk at the time of the vehicle 2 stopping. In this case, an amount of application of the brake to be applied per predetermined unit time is stored into the storage 202. Thereby, a deceleration amount (an amount of change in negative acceleration) at the time of stopping is set, for example, so that the vehicle 2 slowly stops at the time of stopping, or the vehicle 2 quickly stops at the time of starting. Furthermore, the setter 214 causes amounts of attenuation of the suspensions according to travel speeds of the vehicle 2 to be stored into the storage 202. Thereby, the amount of attenuation when the vehicle 2 is traveling at a low speed is reduced, and shakes during travel is absorbed. Furthermore, the setter 214 causes amounts of attenuation of the suspensions according to travel routes to be stored into the storage 202. Thereby, an amount of attenuation of the suspensions is set, for example, so that, in the case of a mountain path or the like, the amount of attenuation of the suspensions is increased to reduce a shake width at the time of rolling or braking.

Figure 3:
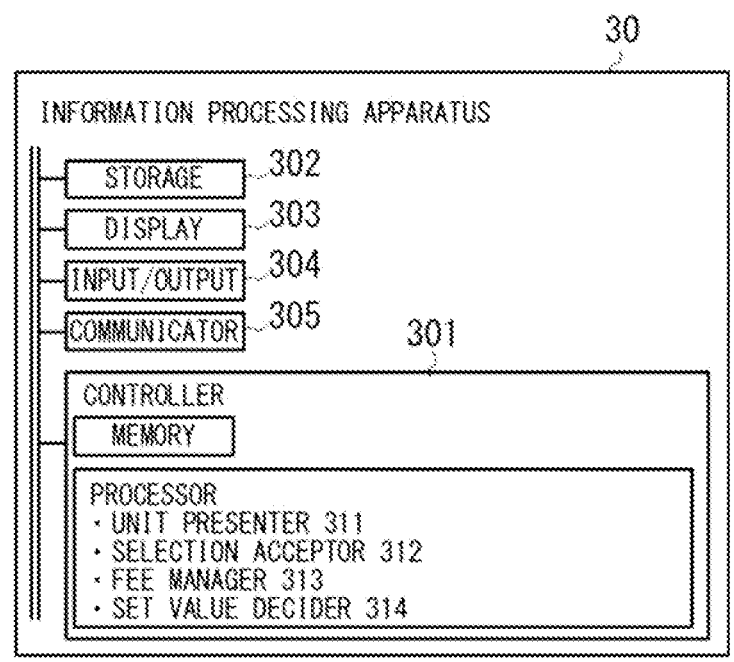
FIG. 3 is a block diagram illustrating a schematic configuration of an information processing apparatus.

FIG. 3 is a block diagram illustrating a schematic configuration of the information processing apparatus 30. The information processing apparatus 30 is a computer provided in the store of the agent that provides vehicle units or the like, and is provided with a controller 301, a storage 302, a display 303, an input/output 304 and a communicator 305.

The controller 301 controls an operation of the whole information processing apparatus 30 to realize various kinds of functions that the information processing apparatus 30 has. The controller 301 is provided, for example, with a processor and memories. The processor comprehensively controls the operation of the information processing apparatus 30. The processor is also referred to as a CPU or an MPU. The memories are, for example, a RCM and a RAM. The ROM is a storage medium that stores various kinds of programs or data. The RAM is a storage medium that temporarily stores various kinds of programs or data. The RAM may be accessible directly from the processor and function as a main memory.

The storage 302 is a storage device such as an HDD and an SSD. The storage 302 functions as an external storage device of the controller 301. The storage 302 stores map information, route information, information indicating vehicle units, fee information about the vehicle units, setting information by an administrator or the like. The display 303 is means that displays information and is, for example, a liquid crystal display device, an organic EL display device and the like.

The input/output 304 is means that performs acceptance of an operation from the user and output of information to the user, and is, for example, buttons, a keyboard, a touch panel, a display, a speaker or the like. The communicator 305 is a communication interface for performing communication with an external apparatus via a communication line. The communicator 305 may be provided with a plurality of communication interfaces such as an interface that directly communicates with other vehicles, in addition to the interface that performs communication via a communication network. As the interface that directly communicates with other vehicles, a communication interface that performs communication using Bluetooth (registered trademark), ZigBee (registered trademark) or the WiFi (registered trademark) ad-hoc mode is given. Further, the communicator 305 may be a communication interface that performs communication using commercial radio (simple radio).

In the controller 301, the processor executes a program stored in the ROM, the storage 302 or the like with the RAM as a work area. By executing the program, the controller 301 functions as functional units such as a unit presenter 311, a selection acceptor 312, a fee manager 313 and a set value decider 314. The controller 301 may realize functions of the plurality of functional units by a plurality of processors or a plurality of cores included in a single processor, respectively. Further, in the controller 301, a single processor may realize the functions of the plurality of functional units by a technique such as a multi-task or multi-thread technique.

The unit presenter 311 presents vehicle units that can be combined as the vehicle 2 among a plurality of types of vehicle units, each of which is an under unit 2D or an upper unit 2P. Further, the unit presenter 311 may present equipment provided in/on the under unit 2D or equipment provided in/on the upper unit 2P. The unit presenter 311 may present the vehicle units that can be combined, based on at least one of an upper speed limit, the number of passengers and a load weight of the vehicle 2. Further, the unit presenter 311 may present the vehicle units based on a purpose of use of the vehicle 2 specified by the user.

FIG. 4 is a diagram illustrating an example of information indicating vehicle units. The information indicating vehicle units (unit information) is registered, for example, with a database stored in the storage 302. As illustrated in FIG. 4, the unit information indicating vehicle units may have identification information, a classification, a purpose of use, the number of passengers, a size, a weight, an upper speed limit and dates and time of use of each vehicle unit. The identification information is, for example, information that uniquely identifies each vehicle unit in this system. The classification is information indicating a type of the vehicle unit or equipment, such as under unit 2D, upper unit 2P, seat, AV equipment, roof carrier, tire, chain for tire and battery.

Note that, in the example of FIG. 4, the seat, the AV equipment and the roof carrier are equipment provided in/on the upper unit 2P, and the tires, the chains for tires and the battery are equipment provided on/in the under unit 2D. Note that the classifications are not limited thereto, and other classifications may be adopted. The purpose is a main purpose in the case where each vehicle unit is adopted and is camping, house-moving, transportation of a heavy thing, movement between city areas, big shopping, skiing or the like. The number of passengers is the number of users who can use the vehicle unit. For example, in the case of the under unit 2D and the upper unit 2P, the number of passengers is the maximum number of passengers specified by a standard, a size or the number of attached seats of a light vehicle, a standard-sized car or the like.

The size may be dimensions of an internal space or a size of the other vehicle unit that can be combined, in addition to external dimensions of each vehicle unit itself. For example, in the case of the under unit 2D, a size of the upper unit 2P to be combined and a tire size can be given. In the case of the upper unit 2P, a size of the under unit 2D to be combined, dimensions of a vehicle room, dimensions of a luggage compartment and dimensions of a luggage bed can be given. The weight may be a loadable weight, in addition to a weight of the vehicle unit itself.

The upper speed limit is a maximum speed of a vehicle adopting the vehicle unit. For example, in the case of an under unit 2D for a large truck, the upper speed limit is 80 km/h. In the case of an under unit 2D for a small special vehicle, the upper speed limit is, for example, 15 km/h. The upper speed limit for an under unit 2D may be specified. For example, 80 km/h is specified if a combined upper unit 2P has a predetermined height or more, and 100 km/h is specified if the height is less than the predetermined height.

The dates and time of use is information indicating dates and time when the vehicle unit is used. For example, it is indicated that, during a period (a use period) from, a use starting date and time to a use ending date and time stored as the use dates and time, the vehicle unit is being used and cannot be provided.

The selection acceptor 312 accepts selection by the user from, among the presented vehicle units. The fee manager 313 calculates a fee in the case of providing the selected vehicle units. For example, the fee manager 313 reads out fee information, about the selected vehicle units from the storage 302, and adds up fees of the vehicle units to calculate a fee to provide a vehicle. Here, if the fee information is stored as a use fee per unit time (for example, one hour), the fee manager 313 may calculate a rental fee by multiplying the fee information by a period of use. The fee manager 313 performs settlement processing for the use fee by communicating with another apparatus for settlement, such as a settlement server of a credit card company.

By deciding set values for the vehicle 2 based on unit information about the selected vehicle units and notifying (outputting) the set values to the onboard device 20 of the vehicle 2, the set value decider 314 causes control based on the set values to be performed. For example, the set value decider 314 decides the lowest speed among upper speed limits of the selected vehicle units, as a set value for an upper speed limit for the vehicle 2. Specifically, if an upper speed limit of the under unit 2D is 100 km/h, and an upper speed limit of the upper unit 2P is 80 km/h, 80 km/h is set as the set value for the upper speed limit for the vehicle 2. Further, the set value decider 314 may set the set value for the upper speed limit to a predetermined value (for example, 80 km/h) according to use purposes, such as a use purpose that includes transportation of a heavy thing or taking children. Furthermore, if the unit information includes a condition like "the upper speed limit is set to 80 km/h in the case of H=1800 mm", the set value decider 314 may decide the set value according to this condition. For example, if a vehicle height in the case of combining an under unit 2D with the unit information which includes this condition and an upper unit 2P selected by the user is 1800 mm or more, the set value decider 314 sets the set value of the upper speed limit to 80 km/h. On the other hand, if the vehicle height is less than 1800 mm in this case, the set value decider 314 does not set the set value for the upper speed limit.

Further, the set value decider 314 may decide an amount of attenuation of the suspensions based on weights of the selected vehicle units. For example, the set value decider 314 adds up the weights of the selected vehicle units; and increases the amount of attenuation of the suspensions if the total weight is heavy, and decreases the amount of attenuation if the total weight is light. Furthermore, if a mountain path is included in a travel route, the set value decider 314 may increase the amount of attenuation and decrease the amount of attenuation if a mountain path is not included. Furthermore, the set value decider 314 may decide the jerks at the time of starting and stopping, based on the weights of the selected vehicle units. For example, the set value decider 314 adds up the weights of the selected vehicle units; and decreases the jerks if the total weight is heavy, and increases the jerks if the total weight is light.

FIG. 5 is a diagram illustrating a process about presentation of provided vehicle units and calculation of a fee by the information processing apparatus 30. When use of vehicle units is requested by the user, the information processing apparatus 30 executes a program to perform the process of FIG. 5. For example, the user directly operates an information processing apparatus provided in the store of the agent that provides vehicle units to select vehicle units. The user may operate the user terminal 50 to connect to the information processing apparatus 30 via a network such as the Internet and select the vehicle units via the network.

At step S10, the information processing apparatus 30 causes an input form to be displayed and prompts input of information such as a use starting date and time, a use ending date and time, a use purpose, the number of passengers, a use starting location, a destination location, a use ending location and a load weight. The information processing apparatus 30 acquires the input information, for example, by input operations by the user to a touch panel.

At step S20, the information processing apparatus 30 refers to a vehicle unit database, extracts under units 2D available from the use starting date and time to the use ending date and time, the dates and time having been acquired at step S10, and presents the under units 2D to the user by causing the under units 2D to be displayed on the display 303 of the information processing apparatus 30. Note that the extracted under units 2D may be presented to the user by causing the under units 2D to be displayed on a display of the user terminal 50. At the time of extracting the under units 2D, the information processing apparatus 30 may narrow under units 2D so that only such under units 2D that correspond to the use purpose acquired at step S10 are extracted.

At step S30, the information processing apparatus 30 judges whether selection of an under unit 2D by the user has been received or not. If selection has not been received, the information processing apparatus 30 repeats this judgment in a predetermined cycle and waits until an under unit 2D is selected. Note that, when the selection is not performed for a predetermined time, or an instruction to stop the selection is given, the process of FIG. 5 may be ended.

If it is judged at step S30 that an under unit 2D has been selected, the information processing apparatus 30 proceeds to step S40, extracts upper units 2P that can be combined with the selected under unit 2D from the database, and causes the upper units 2P to be displayed on the display 303 to present the upper units 2P to the user. Note that the extracted upper units 2P may be presented to the user by causing the upper units to be displayed on the display of the user terminal 50. At the time of extracting upper units 2P, the information processing apparatus 30 may narrow upper units 2P so that only such upper units 2P that correspond to the use purpose acquired at step S10 are extracted.

At step S50, the information processing apparatus 30 judges whether selection of an upper unit 2P by the user has been received or not. If selection has not been received, the information processing apparatus 30 repeats this judgment in a predetermined cycle and waits until an upper unit 2P is selected. Note that, when the selection is not performed for a predetermined time, or an instruction to stop the selection is given, the process of FIG. 5 may be ended.

If it is judged at step S50 that an upper unit 2P has been selected, the information processing apparatus 30 proceeds to step S60, extracts equipment that can be attached to the selected under unit 2D and upper unit 2P from a database, and presents the equipment.

At step S70, the information processing apparatus 30 judges whether selection of equipment by the user has been received or not. If selection has not been received, the information processing apparatus 30 repeats this judgment in a predetermined cycle and waits until equipment is selected. Note that, when the selection is not performed for a predetermined time, or an instruction to stop the selection is given, the process of FIG. 5 may be ended.

If it is judged at step S70 that equipment has been selected, the information processing apparatus 30 determines a rental fee (a use fee) for each of the selected vehicle units by multiplying fee information about the vehicle unit by a period of use, and adds up the rental fees to calculate a sum total of the rental fees (step S80).

At step S90, the information processing apparatus 30 presents the calculated rental fee to the user and prompts settlement of the rental fee. For example, if the user selects use of a credit card or electronic money, the information processing apparatus 30 accesses to a settlement server of the credit card or electronic money and performs settlement processing.

At step S100, the information processing apparatus 30 judges whether the settlement has been completed or not, and ends the process of FIG. 5 if the settlement cannot be performed.

If the settlement has been completed at step S100, the information processing apparatus 30 proceeds to step S110 and decides set values based on unit information about each of the selected vehicle units. For example, the information processing apparatus 30 decides the set values based on the upper speed limit, the use purpose and the weight of a vehicle (a gross weight when the vehicle units are combined) in the unit information.

At step S120, the information processing apparatus 30 notifies the user terminal 50 and the terminal 40 in the maintenance facility that a procedure for using the vehicle units has been completed, and of information indicating the vehicle units and the equipment, and information about the vehicle units to be provided, such as the set values decided at step S110. A responsible person in the maintenance factory combines the vehicle units based on the vehicle unit list, causes the set values to be stored into the storage 202, and provides the vehicle units for the user by the use starting date and time. Note that, if a vehicle 2 obtained by combining these vehicle units is an autonomous car, the information processing apparatus 30 may cause the vehicle 2 to autonomously move to the use starting point by transmitting route information including the use starting date and time and the use starting point to the onboard device 20 of the vehicle 2.

Though FIG. 5 illustrates an example of selecting an under unit 2D, an upper unit 2P and equipment at steps S20, S40 and S60, it is not necessary to use all of these, and it may be selected not to use at each of steps S20, S40 and S60. In other words, it may be selected not to use at step S20 (S30: No), and the upper unit 2P and the equipment may be selected at steps S40 and S60. In this case, for example, the user brings an under unit 2D the user owns into the maintenance facility and causes the upper unit 2P and the equipment to be attached.

Thus, according to the present embodiment, a rental business can be realized in which selection of vehicle units by a user is accepted, rental fees for the vehicle units are calculated, and the vehicle units are rented in exchange for the rental fees.

Further, since the information processing apparatus 30 of the present embodiment decides set values based on unit information about selected vehicle units, appropriate set values can be set according to combination of vehicle units selected by the user at will. Thereby, the onboard device 20 of the vehicle 2 can perform appropriate control according to a state of the vehicle 2 after combination.

Second Embodiment

A user selects vehicle units in the first embodiment at will. The present embodiment indicates a configuration in which vehicle units that can be combined with the vehicle 2 that the user owns are extracted, and vehicle units to be used are selected from among the extracted vehicle units. In comparison with the first embodiment described above, the present embodiment is different in the configuration of selecting vehicle units, and other configurations are the same as those of the first embodiment described above. Therefore, the same reference numerals/symbols are given to the same components, and duplicated description of the components are omitted.

Figure 6:
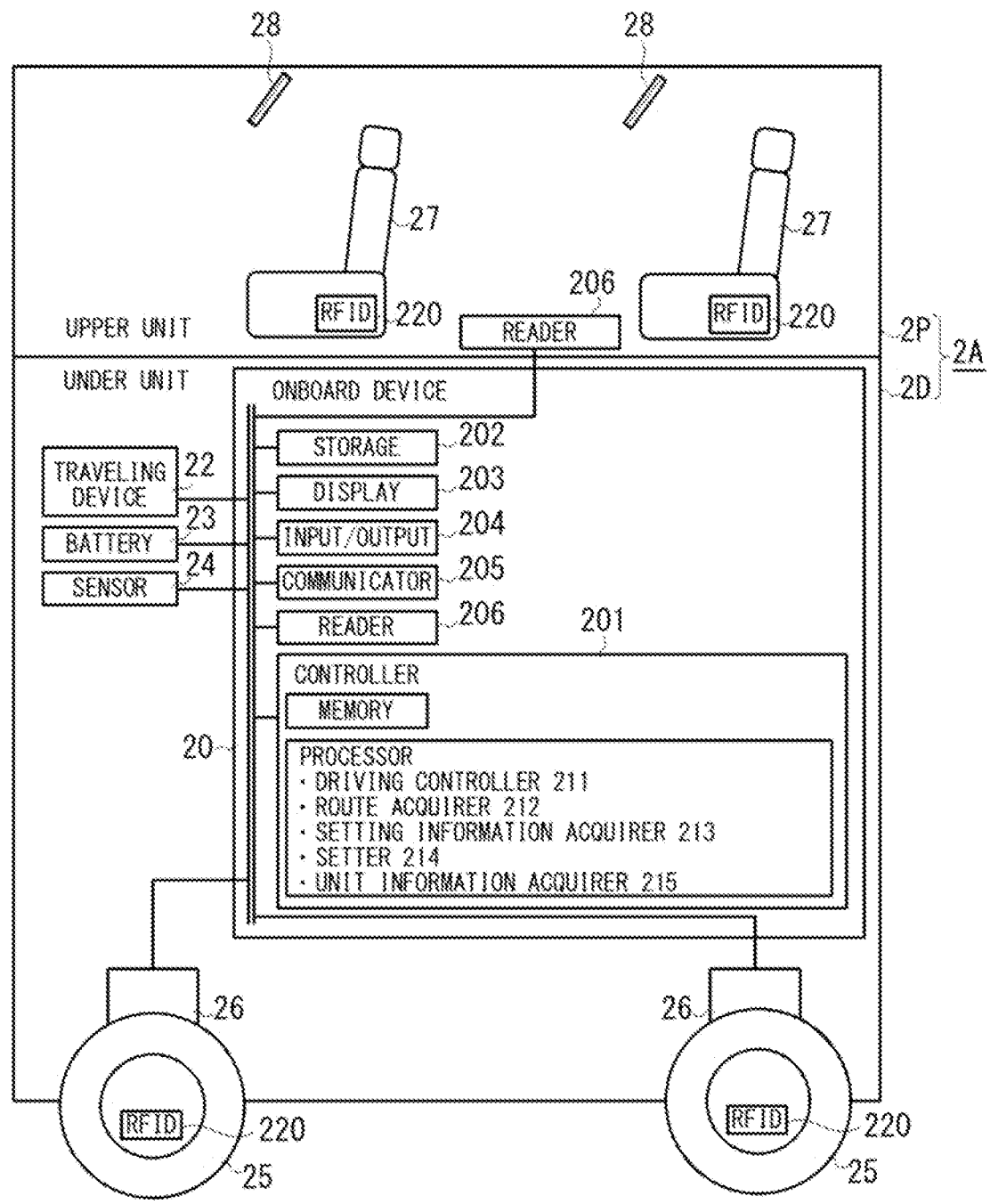
FIG. 6 is a schematic configuration diagram of a vehicle according to a second embodiment.

FIG. 6 is a schematic configuration diagram of the vehicle 2 according to the present second embodiment. As illustrated in FIG. 6, vehicle units constituting the vehicle 2 of the present embodiment is provided with part tags 220 in which unit information is recorded. Furthermore, the part tags 220 are provided on equipment of the vehicle units, and information about the equipment is recorded. Note that the part tags 220 do not have to be provided on all the equipment but only have to be provided on a part of the equipment that influences customization. Each part tag 220 is an element which unit information can be read from and written to, such as an RFID (radio frequency identifier) tag, an IC card, a flash memory or a RCM. The part tag 220 is not limited to the element that stores the unit information as an electrical signal but may be a recording medium in which the unit information is recorded by printing like a two-dimensional barcode. The part tag 220 of the present embodiment is a passive type RFID tag.

In comparison with the onboard device 20 of FIG. 2, an onboard device 20A of the vehicle 2 is further provided with a reader 206 for the part tags 220. The reader 206 transmits a radio wave for reading, receives a radio wave transmitted by the part tag 220 of each vehicle unit using the above radio wave, and reads unit information from the received radio wave. Note that a plurality of readers 206 may be provided in the vehicle 2. For example, the reader 206 may be provided in each of the under unit 2D and the upper unit 2P.

The controller 201 functions as a unit information acquirer 215 that controls the reader 206. When unit information is requested by an information processing apparatus 30A, a unit information acquirer 215 collects unit information about the vehicle units constituting the vehicle 2 from the part tags 220 and transmits the unit information to the information processing apparatus 30A.

Figure 7:
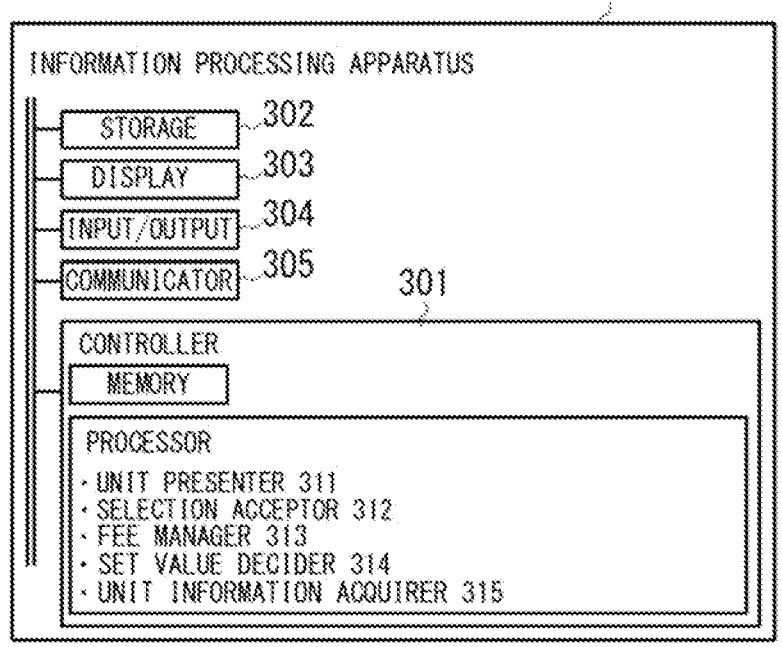
FIG. 7 is a schematic configuration diagram of an information processing apparatus according to the second embodiment.

FIG. 7 is a schematic configuration diagram of the information processing apparatus 30A according to the present embodiment. As illustrated in FIG. 7, the information processing apparatus 30A of the present embodiment further has a function of a unit information acquirer 315, in comparison with the information processing apparatus 30 of the first embodiment. When use of vehicle units is requested by the user, the unit information acquirer 315 acquires unit information about the vehicle 2 with which the vehicle units are to be combined, from the onboard device 20A.

FIG. 8 is a diagram illustrating a process about presentation of provided vehicle units and calculation of a fee by the information processing apparatus 30A of the present embodiment. When use of vehicle units is requested by the user, the information processing apparatus 30A executes a program to perform the process of FIG. 8.

At step S200, the information processing apparatus 30A communicates with the onboard device 20 of a vehicle (hereinafter, also referred to as a base vehicle) 2 with which vehicle units are to be combined, such as the vehicle 2 the user owns, and requests unit information about vehicle units constituting the base vehicle 2. In response to this, the onboard device 20 reads the unit information about the vehicle units from the part tags 220 using the reader 206 and transmits the unit information to the information processing apparatus 30A.

At step S210, the information processing apparatus 30A acquires the unit information transmitted from the onboard device 20 of the base vehicle 2.

At step S220, the information processing apparatus 30A causes an input form, to be displayed and prompts input of information such as a use starting date and time, a use ending date and time, a use purpose, the number of passengers, a use starting location, a destination location, a use ending location and a load weight. The information processing apparatus 30A acquires the input information, for example, by operations to a touch panel by the user.

At step S230, the information processing apparatus 30A refers to a vehicle unit database, and extracts vehicle units that can be combined with the vehicle units of the base vehicle 2 of the unit information acquired at step S210. Here, the information processing apparatus 30A extracts vehicle units that are available from the use starting date and time to the use ending date and time, that is, such that are not scheduled to be used on corresponding dates and time and presents them to the user. For example, the information processing apparatus 30A extracts upper units 2P that can be combined with the under unit 2D of the base vehicle 2 from the database. At the time of extracting vehicle units, the information processing apparatus 30A may narrow vehicle units so that only such vehicle units that correspond to the use purpose acquired at step S220 are extracted. For example, if the use purpose is skiing, the information processing apparatus 30A extracts upper units 2P that can be combined with the under unit 2D of the base vehicle 2 and are provided with a roof carrier from the database. Further, the information processing apparatus 30A may extract and present equipment that can be attached to the under unit 2D or the upper unit 2P. The user selects what he uses, among the presented vehicle units and equipment, and causes the selection to be completed, for example, by pressing a confirm button.

At step S240, the information processing apparatus 30A judges whether the selection of vehicle units by the user has been completed or not. If the selection has not been completed, the information processing apparatus 30A repeats this judgment in a predetermined cycle and waits until the selection of vehicle units is completed. Note that, when the selection is not performed for a predetermined time, or an instruction to stop the selection is given, the process of FIG. 8 may be ended.

If the selection of vehicle units has been completed at step S240, the information processing apparatus 30A determines a rental fee for each of the selected vehicle units by multiplying fee information about the vehicle unit by a period of use, and adds up the rental fees to calculate a sum total of the rental fees (step S250).

At step S260, the information processing apparatus 30A presents the calculated rental fee to the user and prompts settlement of the rental fee.

At step S270, the information processing apparatus 30A judges whether the settlement has been completed or not, and ends the process of FIG. 8 if the settlement cannot be performed.

If the settlement has been completed at step S270, the information processing apparatus 30A proceeds to step S280 and decides set values based on unit information of the selected unit information.

At step S290, the information processing apparatus 30A notifies the user terminal 50 and the terminal 40 in the maintenance facility that a procedure for using the vehicle units has been completed, and of information indicating the vehicle units and the equipment, and information about the vehicle units to be provided, such as the set values decided at step S280.

Thus, according to the present embodiment, a rental business can be realized in which rental fees for vehicle units selected by the user, from among vehicle units that can be combined with the vehicle 2 the user owns, are calculated, and the vehicle units are rented in exchange for the rental fees. Especially, in the present embodiment, since unit information about the vehicle units constituting the base vehicle 2 is acquired from the onboard device 20, and vehicle units that can be combined with the vehicle units are presented to the user, it is possible to easily select available vehicle units. Thereby, the user can easily customize the vehicle 2 he owns and can easily utilize the vehicle 2 for purposes different from usual purposes, such as camping and house-moving.

The control method described in the above embodiments is executed by a processor of a computer reading and executing a computer program. Such a computer program may be provided for the computer by a non-transitory computer-readable medium that is connectable with a system bus of the computer or may be provided for the computer via a network. The non-transitory computer-readable medium is, for example, a disk of any type such as a magnetic disk (a floppy (registered trademark) disk, a hard disk drive (HDD) and the like) and an optical disk (a CD-ROM, a DVD disk, a Blu-ray disk and the like). Further, the non-transitory computer-readable medium includes a read-only memory (ROM), a random-access memory (RAM), an EPROM, an EEPROM, a magnetic card, a flash memory, an optical card and a medium of any type suitable for storing electronic instructions.

What is claimed is:

1. An information processing apparatus comprising a controller and a storage coupled to the controller configured to execute:

presenting a plurality of vehicle units extracted from among a plurality of types of under units each of which is provided with a driving mechanism configured to cause wheels to rotate and a plurality of types of upper units to be loaded on any of the under units, the plurality of vehicle units being combinable with a vehicle owned by a user, to the user;

accepting selection by the user from among the plurality of vehicle units; and calculating a fee in the case of providing one or more selected vehicle units; and the storage configured to register unit information indicating the vehicle units and fee information about the vehicle units, wherein each of the under units and the upper units is provided with a part tag in which unit information is recorded, the vehicle owned by the user is provided with one of the vehicle units that is either one of the under units or one of the upper units beforehand and a vehicle control apparatus being provided with a reader for an owner part tag in which vehicle unit information is recorded, the reader transmits a radio wave for reading the vehicle unit information to the owner part tag, the reader receives a radio wave transmitted by the owner part tag using the radio wave transmitted by the reader, the reader reads the vehicle unit information recorded in the owner part tag from the received radio wave, the controller receives the vehicle unit information read by the reader via a communication interface, the controller extracts the plurality of vehicle units that are combinable with the vehicle owned by the user, based on the vehicle unit information read by the reader and the unit information registered in the storage, the controller presents the extracted plurality of vehicle units, the controller calculates the fee in the case of providing the one or more selected vehicle units by reading out the fee information about the one or more selected vehicle units from the storage, the controller causes the vehicle to be assembled with the one or more selected vehicle units, and causes the assembled vehicle to move to a use starting point.

2. The information processing apparatus according to claim 1, wherein the controller presents the plurality of vehicle units that is combinable with the vehicle, based on at least one of a destination location, the number of passengers and a load weight input by the user.

3. The information processing apparatus according to claim 1, wherein the controller presents the plurality of vehicle units based on a use purpose of the vehicle specified by the user.

4. The information processing apparatus according to claim 1, wherein the controller outputs setting information for setting a travel condition to the vehicle based on combination of the vehicle units selected by the user.

5. The information processing apparatus according to claim 4, wherein the travel condition is at least one of an upper speed limit, a setting for suspensions, a jerk at the time of starting and a jerk at the time of stopping.

6. The information processing apparatus according to claim 1, wherein, when the vehicle units are rented, the controller calculates the fee based on a period of use from start to end of rental of the vehicle units.

7. An information processing system comprising:

a vehicle control apparatus mounted on an under unit or an upper unit of a vehicle configured by combining the under unit and the upper unit, the under unit comprising a driving mechanism configured to cause wheels to rotate, and the upper unit to be loaded on the under unit; and an information processing apparatus configured to perform a process for providing a vehicle unit that is the under unit or the upper unit, wherein the information processing apparatus comprises a controller and a storage coupled to the controller configured to execute:

presenting a plurality of vehicle units that is combinable with a vehicle owned by a user, among a plurality of types of the vehicle units, to the user, each of the plurality of types of the vehicle units being the above vehicle unit;

accepting selection by the user from among the plurality of vehicle units; and calculating a fee in the case of providing one or more selected vehicle units; and the storage configured to register unit information indicating the vehicle units and fee information about the vehicle units, wherein each of the under units and the upper units is provided with part tag in which the unit information is recorded, the vehicle owned by the user is provided with one of the vehicle units that is either one of the under units or one of the upper units beforehand and a vehicle control apparatus being provided with a reader for an owner part tag in which vehicle unit information is recorded, the reader transmits a radio wave for reading the vehicle unit information to the owner part tag, the reader receives a radio wave transmitted by the owner part tag using the radio wave transmitted by the reader, the reader reads the vehicle unit information recorded in the owner part tag from the received radio wave, the controller receives the vehicle unit information read by the reader via a communication interface, the controller extracts the plurality of vehicle units that are combinable with the vehicle owned by the user, based on the vehicle unit information read by the reader and the unit information registered in the storage, the controller presents the extracted plurality of vehicle units, and the controller calculates the fee in the case of providing the one or more selected vehicle units by reading out the fee information about the one or more selected vehicle units from the storage.

8. The information processing system according to claim 7, wherein the controller presents the plurality of vehicle units that is combinable with the vehicle owned by the user, based on at least one of a destination location, the number of passengers and a load weight input by the user.

9. The information processing system according to claim 7, wherein the controller presents the plurality of vehicle units based on a use purpose of the vehicle owned by the user specified by the user.

10. The information processing system according to claim 7, wherein the controller outputs setting information for setting a travel condition to the vehicle owned by the user based on combination of the vehicle units selected by the user.

11. The information processing system according to claim 10, wherein the travel condition is at least one of an upper speed limit, a setting for suspensions, a jerk at the time of starting and a jerk at the time of stopping.

12. The information processing system according to claim 7, wherein, when the vehicle units are rented, the controller calculates the fee based on a period of use from start to end of rental of the vehicle units.

13. An information processing method wherein a computer executes:
- presenting a plurality of vehicle units extracted from among a plurality of types of under units each of which is provided with a driving mechanism configured to cause wheels to rotate and a plurality of types of upper units to be loaded on any of the under units, the plurality of vehicle units being combinable with a vehicle owned by a user, to the user;
- accepting selection by the user from among the plurality of vehicle units; and
- calculating a fee in the case of providing one or more selected vehicle units; and
- registering unit information indicating the vehicle units and fee information about the vehicle units, wherein
- each of the under units and the upper units is provided with a part tag in which the unit information is recorded,
- the vehicle owned by the user is provided with one of the vehicle units that is either one of the under units or one of the upper units beforehand and a vehicle control apparatus being provided with a reader for an owner part tag in which vehicle unit information is recorded,
- the reader transmits a radio wave for reading the vehicle unit information to the owner part tag;
- the reader receives a radio wave transmitted by the owner part tag using the radio wave transmitted by the reader,
- the reader reads the vehicle unit information recorded in the owner part tag from the received radio wave,
- the computer receives the vehicle unit information read by the reader via a communication interface,
- the computer extracts the plurality of vehicle units that are combinable with the vehicle owned by the user, based on the vehicle unit information read by the reader and the unit information registered in the computer,
- the computer presents the extracted plurality of vehicle units, and
- the computer calculates the fee in the case of providing the one or more selected vehicle units by reading out the fee information about the one or more selected vehicle units from the computer,
- the computer causes the vehicle to be assembled with the one or more selected vehicle units, and causes the assembled vehicle to move to a use starting point.

14. The information processing method according to claim 13, wherein the computer presents the plurality of vehicle units that is combinable with the vehicle, based on at least one of a destination location, the number of passengers and a load weight input by the user.

15. The information processing method according to claim 13, wherein the computer presents the plurality of vehicle units based on a use purpose of the vehicle specified by the user.

16. The information processing method according to claim 13, wherein the computer outputs setting information for setting a travel condition to the vehicle based on combination of the vehicle units selected by the user.

17. The information processing method according to claim 16, wherein the travel condition is at least one of an upper speed limit, a setting for suspensions, a jerk at the time of starting and a jerk at the time of stopping.

* * * * *